United States Patent Office 3,451,972
Patented June 24, 1969

3,451,972
PROCESS FOR PREPARING POLYETHYLENE TEREPHTHALATE USING NICKEL HYDROXIDE AND NICKEL PHENOXIDES AS POLYCONDENSATION CATALYSTS
Mary J. Stewart, Media, and John A. Price, Swarthmore, Pa., assignors to FMC Corporation, Philadelphia, Pa., a corporation of Delaware
No Drawing. Filed Dec. 13, 1966, Ser. No. 601,324
Int. Cl. C08g 17/015, 17/013
U.S. Cl. 260—75                      6 Claims

ABSTRACT OF THE DISCLOSURE

Process for preparing polyethylene terephthalate comprising carrying out an ester-interchange reaction between ethylene glycol and dimethyl terephthalate and polycondensing the reaction product thereof in the presence of nickel hydroxide or a nickel salt of phenol or an alkyl substituted phenol.

---

This invention relates to an improved method for the preparation of linear polyesters. More particularly, it relates to an improved polycondensation catalyst for use in the transesterification method of preparing highly polymeric filament-forming polyesters.

The manufacture of filament-forming polyesters from a dialkyl terephthalate and a diol is well-known in the art. In the preparation of such polyesters a dialkyl terephthalate and a diol are first combined and subjected to a transesterification or ester-interchange reaction in the presence of a transesterification catalyst at elevated temperature and atmospheric pressure. The resulting product or prepolymer is then polycondensed at higher temperatures and under reduced pressure in the presence of a polycondensation catalyst to form the desired polyester resin.

It is generally considered that a polyethylene terephthalate resin suitable for spinning into filaments should have a carboxyl content value of about or below 50 equivalents per million grams (eq./$10^6$ gr. or meq./kg.), a melting point of about at least 258–260° C., and an intrinsic viscosity in the range of about 0.60 or more (determined in a 60% phenol and 40% tetrachloroethane solution, wt./wt., at 30° C.), in order for the filaments formed therefrom to possess a satisfactory level of hydrolytic stability, thermal stability, and ultra-violet light stability, and a high degree of tenacity, which is necessary for the use of such filaments in the manufacture of fibers such as are used in wash and wear clothing. Further, it is essential that filament-forming polyester resins be as colorless as possible. Additionally, from a commercial standpoint, it is obviously desirable that the polyester resin be produced in the shortest possible time and the desired degree of polymerization be obtained.

It is an object of the present invention to prepare highly polymeric linear polyesters by an ester-interchange reaction between an ester of a dicarboxylic acid and a diol, so as to form a polyester prepolymer, then to polycondense the said polyester prepolymer in the presence of an improved polycondensation catalyst.

Another object of the present invention is to prepare filament-forming polyethylene terephthalate by carrying out a transesterification reaction between dimethyl terephthalate and ethylene glycol in the presence of an ester-interchange catalyst and polycondensing the resulting product in the presence of an improved polycondensation catalyst.

It is another object of the present invention to prepare a highly polymeric polyethylene terephthalate by polycondensing bis-2(hydroxyethyl)terephthalate in the presence of an improved polycondensation catalyst.

These and other objects are accomplished in accordance with the present invention which involves a method for preparing highly polymeric polyethylene terephthalate wherein dimethyl terephthalate is reacted with ethylene glycol in the presence of an ester-interchange catalyst to form a polyester prepolymer and where the resulting polyester prepolymer is polycondensed, the improvement comprising carrying out the polycondensation of the polyester prepolymer in the presence of a catalytic amount of nickel hydroxide or a nickel salt of phenol or alkyl substituted phenol.

The polycondensation catalysts of the present method can be represented by the formula $Ni(OR)_2$, wherein R represents a hydrogen atom, a phenyl radical, or a lower mono-, di-, or trialkyl substituted phenyl radical (alkaryl) wherein the alkyl groups have from 1 to 5 carbon atoms. The carbon chains of the alkyl groups may be straight or branched. The subject polycondensation catalysts may be suitably varied to meet any requirements of reaction conditions and desired product. Therefore, the present method is not to be limited to any particular suitable nickel compounds that fall within the scope of the above formula. For example, among the polycondensation catalysts that can be used in accordance with the present method are nickel hydroxide, nickel bis(orthopropylphenoxide), nickel bis(phenoxide), nickel bis(meta-ethylphenoxide), nickel bis(meta-tert-butylphenoxide), nickel bis(2,6-di-tert-butyl-4-methylphenoxide), nickel bis(2-methyl-6-ethylphenoxide), and the like or combinations thereof.

In general, the preparation of polyethylene terephthalate resin via the ester-interchange reaction is carried out with a molar ratio of ethylene glycol to dimethyl terephthalate of from about 1:1 to about 15:1 respectively, but preferably from about 1.2:1 to about 2.6:1. The esterinterchange reaction is generally carried out at atmospheric pressure in an inert atmosphere such as nitrogen, initially at a temperature range of from about 125° C. to about 250° C., but preferably between about 150° C. and 200° C. in the presence of a transesterification catalyst. During the first stage of this reaction, methyl alcohol is evolved and is continuously removed by distillation. After a reaction period of 1 to 2 hours, the temperature of the reaction mixture is raised to from about 200° C. to about 300° C. for approximately 1 to 3 hours in order to complete the reaction, so as to form the desired polyester prepolymer and distill off any excess glycol. The prepolymer product of the transesterification reaction between ethylene glycol and dimethyl terephthalate is comprised mainly of bis-2(hydroxyethyl)terephthalate. The second stage or polycondensation step of the present method is achieved under reduced pressure within the range of from about 0.05 mm. to 20 mm. of mercury at temperatures from about 225° C. to about 325° C. for about 3 to 5 hours in the presence of a polycondensation catalyst of the present invention.

Any suitable transesterification or ester-interchange catalyst, for example lithium hydride or zinc acetate, can be used to catalyze the present transesterification reaction. Generally, a transesterification catalyst is used in concentrations of from about 0.01% to about 0.20%, based on the weight of the dialkyl terephthalate in the initial reaction mixture.

The polycondensation catalysts of the present invention are generally employed in amounts ranging from about 0.01% to about 0.2%, based on the weight of the polyester prepolymer to be polycondensed. Usually, it has been found that from about 0.02% to about 0.1% of nickel hydroxide or a nickel salt of phenol or alkyl substituted phenol catalyst of the present invention is preferred in most instances. Higher or lower concentrations of the present polycondensation catalysts can also be used in the subject polycondensation step. However, when concentrations less than the above are used, their effectiveness is generally reduced, whereas if concentrations greater than this are used, no further improvement in the present method or desired product is generally obtained.

The following examples represent several preferred embodiments of, and will serve to further illustrate the present invention. All parts are by weight unless otherwise indicated.

EXAMPLE I

A mixture comprising 600 g. of dimethyl terephthalate, 396 g. of ethylene glycol, and 0.24 g. of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and ethylene glycol and form the polyester prepolymer comprised mainly of bis-2(hydroxyethyl)terephthalate. The prepolymer product was allowed to cool under an atmosphere of nitrogen.

EXAMPLE II 50 grams of the prepolymer product of Example I was mixed with 0.02 g. of nickel hydroxide $(Ni(OH)_2)$ and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I, and formation of a polyethylene terephthalate resin. The resulting polyester resin product had an intrinsic viscosity of 0.60, a carboxyl content value of 16.9 (meq./kg.) and a melting point of 264° C. The resin product was very light gray-white in color.

EXAMPLE III 50 grams of the prepolymer product of Example I was mixed with 0.02 g. of nickel bis(meta-tert-butylphenoxide), $(Ni[OC_6H_4C(CH_3)_3]_2)$ and placed in a reaction vessel. The reaction mixture was heated to about 280° C. under reduced pressure of from about 280° C. under reduced pressure of from about 0.05 to about 0.1 mm. of mercury while under agitation for about three hours to bring about the polycondensation of the prepolymer product and formation of a polyester resin product. The resulting polyethylene terephthalate resin had an intrinsic viscosity of 0.58, a carboxyl content value of 8.9 (meq./kg.), and a melting point of 266° C. The resin product was very pale gray-white in color.

EXAMPLE IV 50 grams of the prepolymer product of Example I was mixed with 0.02 g. of nickel bis(2,6-di-tert-butyl-4-methylphenoxide), $(Ni[OC_6H_2(CH_3)[C(CH_3)_3]_2]_2)$, and placed in a reaction vessel. The reaction mixture was heated to about 280° C. under reduced pressure of from about 0.05 to about 0.1 mm. of mercury while under agitation for about three hours to bring about the polycondensation of the prepolymer product of Example I and formation of a polyester resin product. The resulting polyethylene terephthalate resin had an intrinsic viscosity of 0.59, a carboxyl content value of 10.9 (meq./kg.), a melting point of 263° C., and was pale gray-white in color.

The intrinsic viscosity of the polyester resin products of the examples above were measured in a 60% phenol and 40% tetrachloroethane solution, wt./wt., at 30° C.

In general, the method of the present invention has been described above with particular reference to polyethylene terephthalate. However, it will be obvious that the subject invention includes within its scope other polymeric polymethylene terephthalates formed from glycol of the series $HO(CH_2)_nOH$, where $n$ is 2 to 10, and suitable dialkyl terephthalates.

The results in the above examples indicate that nickel hydroxide and nickel salts of phenol or alkyl substituted phenol when used in accordance with the present method facilitates the preparation of and enhances the polyester resins produced. By the use of the present method, polyester resins are obtained which are characterized by low carboxyl content values, high molecular weights, as indicated by the intrinsic viscosity, and excellent color, so as to make such resins particularly suitable for use in preparing polyester filaments.

It will be apparent that various different embodiments of the invention may be made practicing this invention without departing from the spirit and scope thereof, and therefore, it is not to be limited except as indicated in the appended claims.

We claim:

1. A process of preparing polyethylene terephthalate resin wherein dimethyl terephthalate is reacted with ethylene glycol in the presence of a transesterification catalyst to form a polyester prepolymer and where the resulting polyester prepolymer is polycondensed, the improvement comprising carrying out the polycondensation of the polyester prepolymer in the presence of a catalytic amount of a polycondensation catalyst represented by the formula $Ni(OR)_2$, wherein R represents hydrogen atom, phenyl radical or lower mono-, di-, or trialkyl substituted phenyl radical.

2. The process of claim 1 wherein the polycondensation catalyst is nickel hydroxide.

3. The process of claim 1 wherein the polycondensation catalyst is nickel bis(meta-tert-butylphenoxide).

4. The process of claim 1 wherein the polycondensation catalyst is nickel bis(2,6-di-tert-butyl-4-methylphenoxide).

5. The process of claim 1 wherein the polycondensation catalyst is nickel bis(phenoxide).

6. A process of preparing filament-forming polyethylene terephthalate which comprises the step of polycondensing bis-2(hydroxyethyl)terephthalate in the presence of a catalytic amount of a polycondensation catalyst which is nickel hydroxide or a nickel salt of phenol or a nickel salt of alkyl substituted phenol.

References Cited

UNITED STATES PATENTS 3,245,959   4/1966   Roeser _____ 260—75

WILLIAM H. SHORT, *Primary Examiner.*

LOUISE P. QUAST, *Assistant Examiner.*